(12) United States Patent
Guigan

(10) Patent No.: US 9,242,270 B2
(45) Date of Patent: Jan. 26, 2016

(54) MANUFACTURE OF EMBOSSED STRUCTURES BY PRINTING PROCESSES

(76) Inventor: Pierre Guigan, Boulogne Billancourt (FR)

( * ) Notice: Subject to any disclaimer, the term of this patent is extended or adjusted under 35 U.S.C. 154(b) by 0 days.

(21) Appl. No.: 13/701,343

(22) PCT Filed: May 27, 2011

(86) PCT No.: PCT/FR2011/000315
§ 371 (c)(1),
(2), (4) Date: Nov. 30, 2012

(87) PCT Pub. No.: WO2011/151536
PCT Pub. Date: Dec. 8, 2011

(65) Prior Publication Data
US 2013/0071568 A1    Mar. 21, 2013

(30) Foreign Application Priority Data
Jun. 3, 2010 (FR) ...................... 10 02340

(51) Int. Cl.
| | |
|---|---|
| *B41M 3/00* | (2006.01) |
| *B41M 3/16* | (2006.01) |
| *B41M 7/00* | (2006.01) |
| *B41M 5/00* | (2006.01) |
| *B05D 5/00* | (2006.01) |
| *B05D 1/26* | (2006.01) |
| *B05D 1/38* | (2006.01) |
| *B05D 3/02* | (2006.01) |
| *B05D 3/06* | (2006.01) |
| *B05D 5/06* | (2006.01) |

(Continued)

(52) U.S. Cl.
CPC .. *B05D 5/00* (2013.01); *B05D 1/26* (2013.01); *B05D 1/38* (2013.01); *B05D 3/0254* (2013.01); *B05D 3/065* (2013.01); *B05D 5/06* (2013.01); *B41M 3/003* (2013.01); *B41M 3/008* (2013.01); *G02B 3/0031* (2013.01); *B05D 2401/32* (2013.01); *B41M 3/16* (2013.01); *B41M 5/0047* (2013.01); *B41M 7/00* (2013.01); *B41M 7/009* (2013.01)

(58) Field of Classification Search
None
See application file for complete search history.

(56) References Cited

U.S. PATENT DOCUMENTS

| | | | |
|---|---|---|---|
| 5,800,907 | A | 9/1998 | Yumoto |
| 6,297,911 | B1 | 10/2001 | Nishikawa et al. |
| 6,546,872 | B1 | 4/2003 | Huffer et al. |

(Continued)

FOREIGN PATENT DOCUMENTS

| | | |
|---|---|---|
| EP | 0722098 A1 | 7/1996 |
| EP | 1 211 095 A1 * | 6/2002 |

(Continued)

*Primary Examiner* — William Phillip Fletcher, III
(74) *Attorney, Agent, or Firm* — The Webb Law Firm

(57) ABSTRACT

The present invention makes it possible to print embossed structures 111, 121 et seq. such as particularly arrays of optical lenses which may be contiguous.
It consists of printing a first surface (S1) which may also equally well be the structures 111, 121 et seq. as the assembly 2 of separation surfaces between these structures, using an ink (M1) and of lowering the surface tension of this ink M1 so that it becomes lower than that of the printing medium, before printing the next layer which is then strongly repelled by the surface S1.
This method makes it possible using very inexpensive known printing techniques to produce embossed structures forming substantial protuberances relative to the basis thereof, this being a major advantage in particular for lens arrays.

9 Claims, 1 Drawing Sheet

(51) Int. Cl.
*G02B 3/00* (2006.01)
*G02C 7/04* (2006.01)

(56) References Cited

U.S. PATENT DOCUMENTS 7,131,380 B2 11/2006 Huffer
7,609,451 B1 10/2009 Scarbrough 2006/0262410 A1 11/2006 Toyoda

FOREIGN PATENT DOCUMENTS

| EP | 1211095 | A1 | 6/2002 |
| EP | 1310377 | A2 | 5/2003 |
| WO | 9509372 | A1 | 4/1995 |
| WO | 2009147353 | A2 | 12/2009 |

* cited by examiner

MANUFACTURE OF EMBOSSED STRUCTURES BY PRINTING PROCESSES

TECHNICAL FIELD

The present invention relates to the manufacture of embossed structures such as for example convex lenses of any types, either cylindrical or spherical, with circular, hexagonal or square pupils, optical fibres, wave-guides, couplers, mixers and switches placed on any kinds of substrates for generating optical and opto-electronic circuits.

It applies known and inexpensive printing techniques such as offset printing, heliography, flexography, screen printing, pad printing and inkjet printing for example.

The problem to be solved is to well separate neighbouring printing structures and not have to locate too finely the printing of several successive layers.

PRIOR ART

Several documents are known which relate to one of the main applications of the present invention, the manufacture of optical lenses, including in particular the following documents.
  U.S. Pat. No. 7,609,451 of Joel Scott Scarborough [US] "Printed article for displaying images having improved definition and depth" (27 Oct. 2009),
  WO9509372 (A1) Yoshihide Yumoto [JP] "Method for making lenses, method for manufacturing an article with a lens, article with a lens and separation-forming resin composition" (published on 6 Apr. 1995),
  And PCT/FR/2009/050883 of Franck Guigan [FR] "Printed optical elements" (May 13, 2009)
With some of these techniques it is actually possible to produce embossed structures by printing.

With the present invention, it is possible to produce embossed structures very close to each other, or even continuous structures, in several successive layers, without having to locate the second layer with very high accuracy.

DISCUSSION OF THE INVENTION

The present invention is a printing method successively consisting of:
  depositing on a sub-assembly called "surface S1", a surface to be printed called surface S0, a liquid or powdery material M1,
  hardening said material M1 by a known means,
  depositing on all or part of said surface S0, a liquid material M2 which in the liquid state, has a surface tension greater than the one which said thereby solidified surface S1 has,
  and hardening said material M2 by a known means,
characterized by the fact that the surface tension of said material M1 is lowered between the deposition of two layers of material M1 and M2, so that said material M1 has:
  before hardening, a surface tension greater than that of the printing medium,
  and after hardening, a surface tension lower than that of the printing medium,
it being specified that by "hardening" is meant hereinbefore both its passing from the liquid state to the solid state and its passing from the powder state to that of a material block.

The present invention is also a device obtained by this method.

BRIEF DESCRIPTION OF THE DRAWINGS

The invention will be understood, and other objects, advantages and features thereof will become more clearly apparent upon reading the description which follows, which is illustrated by the appended drawings, wherein.

Figure 1A:
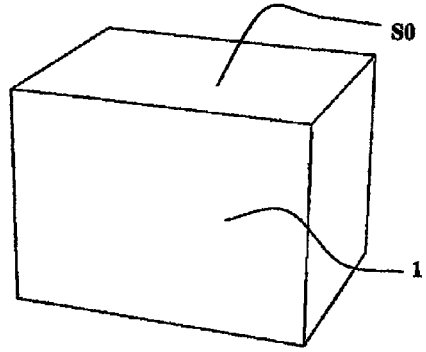
FIGS. 1a to 1f illustrate the successive steps of the method.

All these figures are perspective views which show a printing medium 1, structures to be printed 111, 121 et seq., and an assembly 2 of surfaces for separating structures to be printed.

DETAILED DESCRIPTION OF PARTICULAR EMBODIMENTS OF THE INVENTION

The present invention uses a known printing method, which resorts to the difference between the surface tension of the printing medium and that of the ink. When the ink has a far greater tension than that of the printing medium, it retracts in order to occupy the minimum surface. The result of this is more accurate printing. This method is well known to printers.

Yoshihide Yumoto [JP]—in WO9509372 (A1) applies it by printing in a first step, lines for separating the structures to be printed, and then the actual structures with an ink which has even greater surface tension. He actually begins by printing the lines for separating lenses and then prints a flat tint which is repelled by these lines and which binds to the medium. The ink of this flat tint is repelled because the ink used for the preliminary printing of the lines for separating lenses has a surface tension lower than that of the medium. This is moreover confirmed by the fact that he indicates that the sought angle between the medium and the ink used for printing the lines for separating lenses is "at least 6 degrees".

This document explains that the sought contact angle between the structures to be printed (which for him are optical lenses) and the lines for separating lenses printed beforehand, is <<at least 15 degrees>>.

The goal pursued by the present invention is much more ambitious: embossed structures forming with the medium an angle clearly greater than 45°. For this, it is not only required that at the same time the medium does not reject the material M2, and that the material M2 be very strongly repelled by the solidified material M1.

The present invention has the originality of lowering the surface tension of the first layer, to an extent such that it becomes lower—if possible clearly lower and as low as possible—than the surface tension of the printing medium.

This modification occurs between the printing of both layers.

The ink of the second layer is thus clearly more repelled by the separation lines than by the actual printing medium.

Such a lowering of the surface tension of the material M1 is easy to obtain by one skilled in the art. For example, it may be obtained by adding silicone components to the material used for making the first layer. By practicing rapid and strong drying (for example with a powerful UV ray), the silicone components then move up to the surface, while lowering the surface tension thereof. Other known tension agents give the possibility of obtaining this tension lowering, which with some of them is all the stronger since hardening is fast.

At the end of this drying, the first layer thus has a surface tension which—according to present invention—becomes less than that of the medium, and the second layer will naturally be placed in the space not covered with the first layer.

Nothing opposes that the difference in surface tensions between the first solidified layer and the second liquid layer be very great, by which very high protuberances may be made.

An increase in temperature may be caused in order to obtain hardening of the material M1, or may result from the chemical reactions which take place during hardening, for example upon applying ultra-violet radiation. In the case when the material M1 is a polymer, it is advantageous to heat it up more after its deposition. Indeed, the surface tension of polymers decreases with temperature. This additional heating-up will also have the effect of heating the printing medium, but the latter may be selected so that its surface tension is less lowered with the rise in temperature than that of the material M1.

The second layer may be directly superposed to the first, and only concern the portion of the surface S0 which is not already covered with the material M1, but this may also be a simple flat tint deposited on the whole surface S0, since this flat tint is rejected by the surface S1.

For the first layer, it is both possible to use powder ink and liquid ink, but the liquid provides the advantage of strongly reacting to the difference in surface tension between the ink and the printing medium.

The surface S1, subject to the printing of the first layer with the material M1, may both be the assembly 2 of the separation surfaces and that of the structure to be printed. Both solutions are possible.

When the surface S1 is the assembly 2 of the separation surfaces, the surface S1 may consist of lines, but it may also consist of wider surfaces than lines, so as to then be able to multiply the printing layers after deposition of M2 while continuing to benefit from the advantage of that the portions located between the printing structures repel the material M2.

Both techniques give the possibility of making arrays of optical lenses and/or optical fibres. For this, it is sufficient that the structures to be printed be transparent in the solid state.

The surfaces for separating the structures to be printed may also be transparent, but advantageously they are opaque when they are not entirely covered by the transparent structures.

The method, object of the present invention, may be applied by only applying two layers, the first as accurate surfaces, and the second as a flat tint on the surfaces having already received the first layer.

One of the advantages of the invention is that the second layer does not need to be located with very great accuracy, and that it is thus possible to make very fine embossed structures, such as for example arrays of optical microlenses, while using printing means with low localization.

Figure 1B:
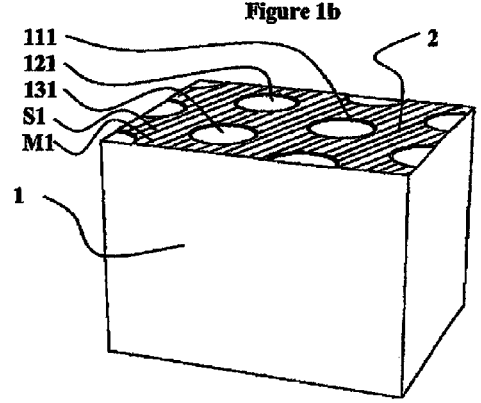
Figure 1C:
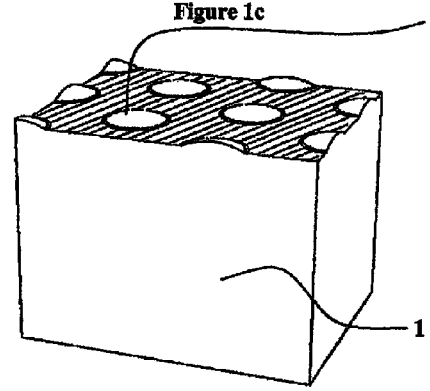
Figure 1D:
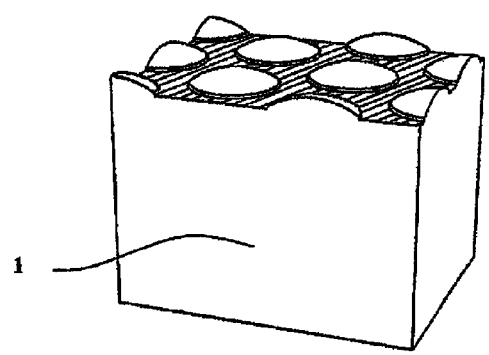
Figure 1E:
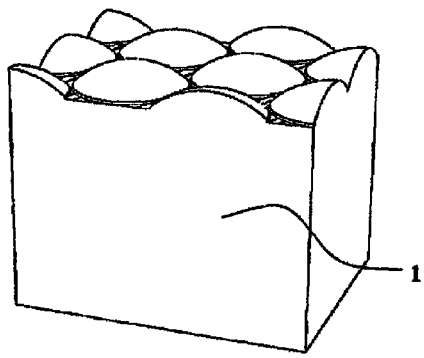
Figure 1F:
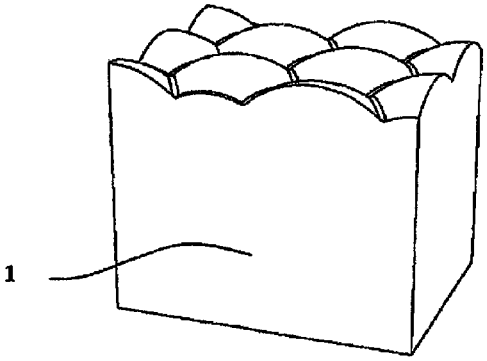

In an enhanced embodiment, illustrated by FIGS. 1*b* to 1*f*, it is possible to multiply the successive flat tints in order to gradually grow the embossed structure.

The applications of the present invention are located in the fields of printing, and in particular of artistical or imaginative printing, in the field of lens arrays, optical circuits, optical fibres, video screens, lights, optical sensors, opto-electronics, etc.

The invention claimed is:

1. A method for printing embossed convex lens structures on a printing medium, comprising:

depositing, on a surface of said printing medium, a subassembly comprising a first layer of a liquid or powdery first material, said first layer additionally comprising a component having the property of lowering the surface tension of said first material during hardening thereof, wherein said subassembly covers said surface of said printing medium except in those areas where a second layer finally is deposited;

hardening said first material;

depositing, at least on those parts of said surface of said printing medium not covered by said subassembly, said second layer of a liquid second material which, in the liquid state, has a surface tension greater than that of said subassembly made of the hardened first material; and hardening said second material, thereby forming said embossed convex lens structures, wherein said component lowers the surface tension of said first material between the deposition of said first and second layers of said first and second materials, so that said first material has, before hardening, a greater surface tension than that of the printing medium, after hardening, a lower surface tension than that of the printing medium, wherein said hardening of said liquid material is defined as its passing from the liquid state to the solid state, and wherein said hardening of said powdery material is defined as its passing from the powdery state to that of a block of material.

2. The printing method according to claim 1, wherein said second material comprises one or several flat tints.

3. The printing method according to claim 1, wherein said first material is a liquid.

4. The printing method according to claim 1, wherein the material of the surface of said subassembly is transparent in the solid state.

5. The printing method according to claim 1, wherein those parts of said surface of said printing medium not covered by said subassembly are opaque in the solid state.

6. The printing method according to claim 1, wherein said hardening of said first material comprises heating to a temperature greater than is required for obtaining its hardening.

7. The printing method according to claim 1, wherein at least one additional layer is printed after the deposition of the second material.

8. The printing method according to claim 1, wherein an angle between the printing medium and the embossed structures is at least 45°.

9. The printing method according to claim 1, wherein said component is a silicone.

* * * * *